(12) United States Patent
McAlister

(10) Patent No.: US 8,205,805 B2
(45) Date of Patent: Jun. 26, 2012

(54) FUEL INJECTOR ASSEMBLIES HAVING ACOUSTICAL FORCE MODIFIERS AND ASSOCIATED METHODS OF USE AND MANUFACTURE

(75) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 13/027,051

(22) Filed: Feb. 14, 2011

(65) Prior Publication Data

US 2011/0210182 A1 Sep. 1, 2011

Related U.S. Application Data

(60) Provisional application No. 61/304,403, filed on Feb. 13, 2010, provisional application No. 61/407,437, filed on Oct. 27, 2010.

(51) Int. Cl.
*F02D 1/06* (2006.01)

(52) U.S. Cl. ........................................ 239/5; 239/102.1

(58) Field of Classification Search ........... 239/5, 102.1, 239/102.2, 88–96, 533.2, 533.3, 533.4, 533.12, 239/585.1–585.5; 123/445, 456, 525
See application file for complete search history.

(56) References Cited

U.S. PATENT DOCUMENTS

| | | | |
|---|---|---|---|
| 1,451,384 A | 4/1923 | Whyte | |
| 2,441,277 A | 5/1948 | Lamphere | |
| 2,721,100 A | 10/1955 | Bodine, Jr. | |
| 3,243,335 A | 3/1966 | Faile | |
| 3,520,961 A | 7/1970 | Suda et al. | |
| 3,594,877 A | 7/1971 | Suda et al. | |
| 3,608,050 A | 9/1971 | Carman et al. | |
| 3,689,293 A | 9/1972 | Beall | |
| 3,931,438 A | 1/1976 | Beall et al. | |
| 3,960,995 A | 6/1976 | Kourkene | |
| 3,976,039 A | 8/1976 | Henault | |
| 3,997,352 A | 12/1976 | Beall | |
| 4,020,803 A | 5/1977 | Thuren et al. | |
| 4,066,046 A | 1/1978 | McAlister | |

(Continued)

FOREIGN PATENT DOCUMENTS

DE 3443022 A1 5/1986

(Continued)

OTHER PUBLICATIONS

"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-4.

(Continued)

*Primary Examiner* — Davis Hwu
(74) *Attorney, Agent, or Firm* — Perkins Coie LLP

(57) ABSTRACT

The present disclosure is directed to fuel injectors that provide efficient injection, ignition, and combustion of various types of fuels. One example of such an injector can include a sensor that detects one or more conditions in the combustion chamber. The injector can also include an acoustical force generator or modifier that is responsive to the sensor and can be configured to (a) induce vibrations in the fuel in the injector body and/or in the combustion chamber, (b) induce vibrations in air in the combustion chamber, (c) induce vibrations in a valve driver or other injector component to actuate a flow valve, and/or (d) control patterning of fuel injected into the combustion chamber.

19 Claims, 6 Drawing Sheets

U.S. PATENT DOCUMENTS

| | | |
|---|---|---|
| 4,095,580 A | 6/1978 | Murray et al. |
| 4,105,004 A | 8/1978 | Asai et al. |
| 4,122,816 A | 10/1978 | Fitzgerald et al. |
| 4,135,481 A | 1/1979 | Resler, Jr. |
| 4,183,467 A | 1/1980 | Sheraton et al. |
| 4,203,393 A | 5/1980 | Giardini |
| 4,293,188 A | 10/1981 | McMahon |
| 4,330,732 A | 5/1982 | Lowther |
| 4,377,455 A | 3/1983 | Kadija et al. |
| 4,448,160 A | 5/1984 | Vosper |
| 4,469,160 A | 9/1984 | Giamei |
| 4,483,485 A | 11/1984 | Kamiya et al. |
| 4,511,612 A | 4/1985 | Huther et al. |
| 4,528,270 A | 7/1985 | Matsunaga |
| 4,536,452 A | 8/1985 | Stempin et al. |
| 4,567,857 A | 2/1986 | Houseman et al. |
| 4,574,037 A | 3/1986 | Samejima et al. |
| 4,677,960 A | 7/1987 | Ward |
| 4,684,211 A | 8/1987 | Weber et al. |
| 4,688,538 A | 8/1987 | Ward et al. |
| 4,733,646 A | 3/1988 | Iwasaki |
| 4,742,265 A | 5/1988 | Giachino et al. |
| 4,760,818 A | 8/1988 | Brooks et al. |
| 4,760,820 A | 8/1988 | Tozzi |
| 4,774,914 A | 10/1988 | Ward |
| 4,774,919 A | 10/1988 | Matsuo et al. |
| 4,777,925 A | 10/1988 | Lasota |
| 4,841,925 A | 6/1989 | Ward |
| 4,922,883 A | 5/1990 | Iwasaki |
| 4,932,263 A | 6/1990 | Wlodarczyk |
| 4,977,873 A | 12/1990 | Cherry et al. |
| 4,982,708 A | 1/1991 | Stutzenberger |
| 5,034,852 A | 7/1991 | Rosenberg |
| 5,035,360 A | 7/1991 | Green et al. |
| 5,036,669 A | 8/1991 | Earleson et al. |
| 5,055,435 A | 10/1991 | Hamanaka et al. |
| 5,056,496 A | 10/1991 | Morino et al. |
| 5,072,617 A | 12/1991 | Weiss |
| 5,076,223 A | 12/1991 | Harden et al. |
| 5,095,742 A | 3/1992 | James et al. |
| 5,107,673 A | 4/1992 | Sato et al. |
| 5,109,817 A | 5/1992 | Cherry |
| 5,131,376 A | 7/1992 | Ward et al. |
| 5,150,682 A | 9/1992 | Magnet |
| 5,193,515 A | 3/1993 | Oota et al. |
| 5,207,208 A | 5/1993 | Ward |
| 5,211,142 A | 5/1993 | Matthews et al. |
| 5,220,901 A | 6/1993 | Morita et al. |
| 5,222,481 A * | 6/1993 | Morikawa .................... 123/435 |
| 5,267,601 A | 12/1993 | Dwivedi |
| 5,297,518 A | 3/1994 | Cherry |
| 5,305,360 A | 4/1994 | Remark et al. |
| 5,328,094 A | 7/1994 | Goetzke et al. |
| 5,329,606 A | 7/1994 | Andreassen |
| 5,343,699 A | 9/1994 | McAlister |
| 5,377,633 A | 1/1995 | Wakeman |
| 5,390,546 A | 2/1995 | Wlodarczyk |
| 5,392,745 A | 2/1995 | Beck |
| 5,394,852 A | 3/1995 | McAlister |
| 5,421,195 A | 6/1995 | Wlodarczyk |
| 5,421,299 A | 6/1995 | Cherry |
| 5,435,286 A | 7/1995 | Carroll, III et al. |
| 5,439,532 A | 8/1995 | Fraas |
| 5,456,241 A | 10/1995 | Ward |
| 5,475,772 A | 12/1995 | Hung et al. |
| 5,517,961 A | 5/1996 | Ward |
| 5,531,199 A | 7/1996 | Bryant et al. |
| 5,549,746 A | 8/1996 | Scott et al. |
| 5,584,490 A | 12/1996 | Inoue et al. |
| 5,588,299 A | 12/1996 | DeFreitas |
| 5,605,125 A | 2/1997 | Yaoita |
| 5,607,106 A | 3/1997 | Bentz et al. |
| 5,608,832 A | 3/1997 | Pfandl et al. |
| 5,676,026 A | 10/1997 | Tsuboi et al. |
| 5,699,253 A | 12/1997 | Puskorius et al. |
| 5,702,761 A | 12/1997 | DiChiara, Jr. et al. |
| 5,704,553 A | 1/1998 | Wieczorek et al. |
| 5,714,680 A | 2/1998 | Taylor et al. |
| 5,715,788 A | 2/1998 | Tarr et al. |
| 5,738,818 A | 4/1998 | Atmur et al. |
| 5,745,615 A | 4/1998 | Atkins et al. |
| 5,746,171 A | 5/1998 | Yaoita |
| 5,767,026 A | 6/1998 | Kondoh et al. |
| 5,797,427 A | 8/1998 | Buescher |
| 5,806,581 A | 9/1998 | Haasch et al. |
| 5,816,217 A | 10/1998 | Wong |
| 5,853,175 A | 12/1998 | Udagawa |
| 5,863,326 A | 1/1999 | Nause et al. |
| 5,876,659 A | 3/1999 | Yasutomi et al. |
| 5,915,272 A | 6/1999 | Foley et al. |
| 5,930,420 A | 7/1999 | Atkins et al. |
| 5,941,207 A | 8/1999 | Anderson et al. |
| 5,947,091 A | 9/1999 | Krohn et al. |
| 6,015,065 A | 1/2000 | McAlister |
| 6,017,390 A | 1/2000 | Charych et al. |
| 6,026,568 A | 2/2000 | Atmur et al. |
| 6,029,627 A | 2/2000 | Vandyne |
| 6,042,028 A | 3/2000 | Xu |
| 6,062,498 A | 5/2000 | Klopfer |
| 6,085,990 A | 7/2000 | Augustin |
| 6,092,501 A | 7/2000 | Matayoshi et al. |
| 6,092,507 A | 7/2000 | Bauer et al. |
| 6,093,338 A | 7/2000 | Tani et al. |
| 6,102,303 A | 8/2000 | Bright et al. |
| 6,131,607 A | 10/2000 | Cooke |
| 6,138,639 A | 10/2000 | Hiraya et al. |
| 6,155,212 A | 12/2000 | McAlister |
| 6,173,913 B1 | 1/2001 | Shafer et al. |
| 6,185,355 B1 | 2/2001 | Hung |
| 6,189,522 B1 | 2/2001 | Moriya |
| 6,253,728 B1 | 7/2001 | Matayoshi et al. |
| 6,267,307 B1 | 7/2001 | Pontoppidan |
| 6,281,976 B1 | 8/2001 | Taylor et al. |
| 6,335,065 B1 | 1/2002 | Steinlage et al. |
| 6,340,015 B1 | 1/2002 | Benedikt et al. |
| 6,360,721 B1 | 3/2002 | Schuricht et al. |
| 6,378,485 B2 | 4/2002 | Elliott |
| 6,386,178 B1 | 5/2002 | Rauch |
| 6,446,597 B1 | 9/2002 | McAlister |
| 6,455,173 B1 | 9/2002 | Marijnissen et al. |
| 6,478,007 B2 | 11/2002 | Miyashita et al. |
| 6,483,311 B1 | 11/2002 | Ketterer et al. |
| 6,490,391 B1 | 12/2002 | Zhao et al. |
| 6,501,875 B2 | 12/2002 | Zhao et al. |
| 6,503,584 B1 | 1/2003 | McAlister |
| 6,506,336 B1 | 1/2003 | Beall et al. |
| 6,516,114 B2 | 2/2003 | Zhao et al. |
| 6,517,011 B1 | 2/2003 | Ayanji et al. |
| 6,532,315 B1 | 3/2003 | Hung et al. |
| 6,542,663 B1 | 4/2003 | Zhao et al. |
| 6,543,700 B2 * | 4/2003 | Jameson et al. ........... 239/102.1 |
| 6,549,713 B1 | 4/2003 | Pi et al. |
| 6,556,746 B1 | 4/2003 | Zhao et al. |
| 6,561,168 B2 | 5/2003 | Hokao et al. |
| 6,567,599 B2 | 5/2003 | Hung |
| 6,571,035 B1 | 5/2003 | Pi et al. |
| 6,578,775 B2 | 6/2003 | Hokao |
| 6,583,901 B1 | 6/2003 | Hung |
| 6,584,244 B2 | 6/2003 | Hung |
| 6,585,171 B1 | 7/2003 | Boecking |
| 6,587,239 B1 | 7/2003 | Hung |
| 6,615,810 B2 | 9/2003 | Funk et al. |
| 6,615,899 B1 | 9/2003 | Woodward et al. |
| 6,621,964 B2 | 9/2003 | Quinn et al. |
| 6,663,027 B2 * | 12/2003 | Jameson et al. ........... 239/585.1 |
| 6,672,277 B2 | 1/2004 | Yasuoka et al. |
| 6,700,306 B2 | 3/2004 | Nakamura et al. |
| 6,705,274 B2 | 3/2004 | Kubo |
| 6,719,224 B2 | 4/2004 | Enomoto et al. |
| 6,722,339 B2 | 4/2004 | Elliott |
| 6,722,340 B1 | 4/2004 | Sukegawa et al. |
| 6,722,840 B2 | 4/2004 | Fujisawa et al. |
| 6,725,826 B2 | 4/2004 | Esteghlal |
| 6,756,140 B1 | 6/2004 | McAlister |
| 6,763,811 B1 | 7/2004 | Tamol, Sr. |
| 6,776,352 B2 * | 8/2004 | Jameson ........................... 239/1 |
| 6,779,513 B2 | 8/2004 | Pellizzari et al. |

| | | |
|---|---|---|
| 6,796,516 B2 | 9/2004 | Maier et al. |
| 6,799,513 B2 | 10/2004 | Schafer |
| 6,811,103 B2 | 11/2004 | Gurich et al. |
| 6,814,313 B2 | 11/2004 | Petrone et al. |
| 6,845,920 B2 | 1/2005 | Sato et al. |
| 6,851,413 B1 | 2/2005 | Tamol, Sr. |
| 6,854,438 B2 | 2/2005 | Hilger et al. |
| 6,898,355 B2 | 5/2005 | Johnson et al. |
| 6,899,076 B2 | 5/2005 | Funaki et al. |
| 6,904,893 B2 | 6/2005 | Hotta et al. |
| 6,912,998 B1 | 7/2005 | Rauznitz et al. |
| 6,940,213 B1 | 9/2005 | Heinz et al. |
| 6,955,154 B1 | 10/2005 | Douglas |
| 6,976,683 B2 | 12/2005 | Eckert et al. |
| 6,984,305 B2 | 1/2006 | McAlister |
| 6,994,073 B2 | 2/2006 | Tozzi et al. |
| 7,007,658 B1 | 3/2006 | Cherry et al. |
| 7,013,863 B2 | 3/2006 | Shiraishi et al. |
| 7,025,358 B2 | 4/2006 | Ueta et al. |
| 7,032,845 B2 | 4/2006 | Dantes et al. |
| 7,070,126 B2 | 7/2006 | Shinogle |
| 7,073,480 B2 | 7/2006 | Shiraishi et al. |
| 7,077,108 B2 | 7/2006 | Fujita et al. |
| 7,086,376 B2 | 8/2006 | McKay |
| 7,104,246 B1 | 9/2006 | Gagliano et al. |
| 7,104,250 B1 | 9/2006 | Yi et al. |
| 7,121,253 B2 | 10/2006 | Shiraishi et al. |
| 7,131,426 B2 | 11/2006 | Ichinose et al. |
| 7,138,046 B2 | 11/2006 | Roychowdhury |
| 7,140,347 B2 | 11/2006 | Suzuki et al. |
| 7,140,353 B1 | 11/2006 | Rauznitz et al. |
| 7,140,562 B2 | 11/2006 | Holzgrefe et al. |
| 7,201,136 B2 | 4/2007 | McKay et al. |
| 7,228,840 B2 | 6/2007 | Sukegawa et al. |
| 7,249,578 B2 | 7/2007 | Fricke et al. |
| 7,255,290 B2 | 8/2007 | Bright et al. |
| 7,278,392 B2 | 10/2007 | Zillmer et al. |
| 7,305,971 B2 | 12/2007 | Fujii |
| 7,340,118 B2 | 3/2008 | Wlodarczyk et al. |
| 7,386,982 B2 | 6/2008 | Runkle et al. |
| 7,404,395 B2 | 7/2008 | Yoshimoto |
| 7,418,940 B1 | 9/2008 | Yi et al. |
| 7,484,369 B2 | 2/2009 | Myhre |
| 7,527,041 B2 | 5/2009 | Wing et al. |
| 7,540,271 B2 | 6/2009 | Stewart et al. |
| 7,554,250 B2 | 6/2009 | Kadotani et al. |
| 7,588,012 B2 | 9/2009 | Gibson et al. |
| 7,628,137 B1 | 12/2009 | McAlister |
| 7,703,775 B2 | 4/2010 | Matsushita et al. |
| 7,707,832 B2 | 5/2010 | Commaret et al. |
| 7,880,193 B2 | 2/2011 | Lam |
| 7,898,258 B2 | 3/2011 | Neuberth et al. |
| 7,918,212 B2 | 4/2011 | Verdejo et al. |
| 7,938,102 B2 | 5/2011 | Sherry |
| 7,942,136 B2 | 5/2011 | Lepsch et al. |
| 2002/0017573 A1 | 2/2002 | Sturman |
| 2002/0070287 A1* | 6/2002 | Jameson et al. ........ 239/102.1 |
| 2002/0084793 A1 | 7/2002 | Hung et al. |
| 2002/0131171 A1 | 9/2002 | Hung |
| 2002/0131666 A1 | 9/2002 | Hung et al. |
| 2002/0131673 A1 | 9/2002 | Hung |
| 2002/0131674 A1 | 9/2002 | Hung |
| 2002/0131686 A1 | 9/2002 | Hung |
| 2002/0131706 A1 | 9/2002 | Hung |
| 2002/0131756 A1 | 9/2002 | Hung |
| 2002/0141692 A1 | 10/2002 | Hung |
| 2002/0150375 A1 | 10/2002 | Hung et al. |
| 2002/0151113 A1 | 10/2002 | Hung et al. |
| 2002/0166536 A1 | 11/2002 | Hitomi et al. |
| 2003/0012985 A1 | 1/2003 | McAlister |
| 2004/0008989 A1 | 1/2004 | Hung |
| 2004/0256495 A1 | 12/2004 | Baker |
| 2005/0045146 A1 | 3/2005 | McKay et al. |
| 2005/0098663 A1 | 5/2005 | Ishii |
| 2005/0257776 A1 | 11/2005 | Bonutti |
| 2006/0016916 A1 | 1/2006 | Petrone et al. |
| 2006/0102140 A1 | 5/2006 | Sukegawa et al. |
| 2006/0108452 A1 | 5/2006 | Anzinger et al. |
| 2006/0169244 A1 | 8/2006 | Allen |
| 2007/0142204 A1 | 6/2007 | Park et al. |
| 2007/0189114 A1 | 8/2007 | Reiner et al. |
| 2007/0283927 A1 | 12/2007 | Fukumoto et al. |
| 2008/0072871 A1 | 3/2008 | Vogel et al. |
| 2008/0081120 A1 | 4/2008 | Van Ooij et al. |
| 2008/0098984 A1 | 5/2008 | Sakamaki |
| 2008/0103672 A1 | 5/2008 | Ueda et al. |
| 2009/0078798 A1 | 3/2009 | Gruendl et al. |
| 2009/0093951 A1 | 4/2009 | McKay et al. |
| 2009/0204306 A1 | 8/2009 | Goeke et al. |
| 2009/0264574 A1 | 10/2009 | Van Ooij et al. |
| 2010/0020518 A1 | 1/2010 | Bustamante |
| 2010/0043758 A1 | 2/2010 | Caley |
| 2010/0108023 A1 | 5/2010 | McAlister |
| 2010/0183993 A1 | 7/2010 | McAlister |
| 2011/0036309 A1 | 2/2011 | McAlister |
| 2011/0042476 A1 | 2/2011 | McAlister |
| 2011/0048371 A1 | 3/2011 | McAlister |
| 2011/0048374 A1 | 3/2011 | McAlister |
| 2011/0048381 A1 | 3/2011 | McAlister |
| 2011/0056458 A1 | 3/2011 | McAlister |
| 2011/0057058 A1 | 3/2011 | McAlister |
| 2011/0132319 A1 | 6/2011 | McAlister |
| 2011/0134049 A1 | 6/2011 | Lin et al. |
| 2011/0146619 A1 | 6/2011 | McAlister |
| 2011/0233308 A1 | 9/2011 | McAlister |

FOREIGN PATENT DOCUMENTS

| | | |
|---|---|---|
| EP | 392594 | 10/1990 |
| EP | 671555 | 9/1995 |
| EP | 1972606 A1 | 9/2008 |
| GB | 1038490 A | 8/1966 |
| JP | 61-023862 | 2/1986 |
| JP | 02-259268 | 10/1990 |
| JP | 08-049623 | 2/1996 |
| JP | 2006-334077 | 12/1996 |
| JP | 2004-324613 A | 11/2004 |
| KR | 2007-0026296 A | 3/2007 |
| KR | 2008-0073635 A | 8/2008 |
| WO | WO-2008-017576 | 2/2008 |

OTHER PUBLICATIONS

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-6.

"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

Bell et al. "A Super Solar Flare." NASA Science. Published: May 6, 2008. Accessed: May 17, 2011. <http://science.nasa.gov/science-news/science-at-nasa/2008/06may_carringtonflare/>. pp. 1-5.

Birchenough, Arthur G. "A Sustained-arc Ignition System for Internal Combustion Engines." Nasa Technical Memorandum (NASA TM-73833). Lewis Research Center. Nov. 1977. pp. 1-15.

Britt, Robert Roy. "Powerful Solar Storm Could Shut Down U.S. for Months—Science News | Science & Technology | Technology News—FOXNews.com." FoxNews.com, Published: Jan. 9, 2009. Accessed: May 17, 2011. <http://www.foxnews.com/story/0,2933,478024,00.html>. pp. 1-2.

Brooks, Michael. "Space Storm Alert: 90 Seconds from Catastrophe." NewScientist. Mar. 23, 2009. pp. 1-7.

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dangers-to-earth-based-technology>. pp. 1-2.

InfraTec GmbH. "Evaluation Kit for FPI Detectors | Datasheet—Detector Accessory." 2009. pp. 1-2.

International Search Report and Written Opinion for Application No. PCT/US2009/067044; Applicant: McAlister Technologies, LLC.; Date of Mailing: Apr. 14, 2010 (11 pages).

International Search Report and Written Opinion for Application No. PCT/US2010/002076; Applicant McAlister Technologies, LLC.; Date of Mailing: Apr. 29, 2011 (8 pages).

International Search Report and Written Opinion for Application No. PCT/US2010/002077; Applicant McAlister Technologies, LLC.; Date of Mailing: Apr. 29, 2011 (8 pages).

International Search Report and Written Opinion for Application No. PCT/US2010/002078; Applicant: McAlister Technologies, LLC.; Date of Mailing: Dec. 17, 2010 (9 pages).

International Search Report and Written Opinion for Application No. PCT/US2010/042812; Applicant: McAlister Technologies, LLC.; Date of Mailing: May 13, 2011 (9 pages).

International Search Report and Written Opinion for Application No. PCT/US2010/042815; Applicant: McAlister Technologies, LLC.; Date of Mailing: Apr. 29, 2011 (10 pages).

International Search Report and Written Opinion for Application No. PCT/US2010/042817; Applicant: McAlister Technologies, LLC.; Date of Mailing: Apr. 29, 2011 (8 pages).

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

Non-Final Office Action for U.S. Appl. No. 12/006,774; Applicant: McAlister Technologies, LLC; Date of Mailing: Jan. 30, 2009, 18 pages.

Non-Final Office Action for U.S. Appl. No. 12/581,825; Applicant: McAlister Technologies, LLC; Date of Mailing: Mar. 25, 2011 (15 pages).

Non-Final Office Action for U.S. Appl. No. 12/804,510; Applicant: McAlister Technologies, LLC; Date of Mailing: Mar. 1, 2011 (10 pages).

Non-Final Office Action for U.S. Appl. No. 12/961,453; Applicant: McAlister Technologies, LLC; Date of Mailing: Jun. 9, 2011 (4 pages).

Notice of Allowance for U.S. Appl. No. 12/006,774; Applicant: McAlister Technologies, LLC; Date of Mailing: Jul. 27, 2009, 20 pages.

Pall Corporation, Pall Industrial Hydraulics. Increase Power Output and Reduce Fugitive Emissions by Upgrading Hydrogen Seal Oil System Filtration. 2000. pp. 1-4.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan. 2010. pp. 83-91.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

Salib et al. "Role of Parallel Reformable Bonds in the Self-Healing of Cross-Linked Nanogel Particles." Langmuir, vol. 27, Issue 7. 2011. pp. 3991-4003.

Erjavec, Jack. "Automotive Technology: a Systems Approach, vol. 2." Thomson Delmar Learning. Clifton Park, NY. 2005. p. 845.

Hollembeak, Barry. "Automotive Fuels & Emissions." Thomson Delmar Learning. Clifton Park, NY. 2005. p. 298.

International Search Report and Written Opinion for Application No. PCT/US2010/002080; Applicant: McAlister Technologies, LLC.; Date of Mailing: Jul. 7, 2011 (8 pages).

International Search Report and Written Opinion for Application No. PCT/US2010/054361; Applicant: McAlister Technologies. LLC.; Date of Mailing: Jun. 30, 2011, 9 pages.

International Search Report and Written Opinion for Application No. PCT/US2010/054364; Applicant: McAlister Technologies, LLC.; Date of Mailing: Aug. 22, 2011, 8 pages.

International Search Report and Written Opinion for Application No. PCT/US2010/059146; Applicant: McAlister• Technologies, LLC.; Date of Mailing: Aug. 31, 2011, 11 pages.

International Search Report and Written Opinion for Application No. PCT/US2010/059147; Applicant: McAlister Technologies, LLC.; Date of Mailing: Aug. 31, 2011, 11 pages.

Non-Final Office Action for U.S. Appl. No. 13/027,051; Applicant: McAlister Technologies, LLC; Date of Mailing: Sep. 1, 2011, 7 pages.

Non-Final Office Action for U.S. Appl. No. 13/141,062; Applicant: McAlister Technologies, LLC; Date of Mailing: Aug. 11, 2011, 12 pages.

Non-Final Office Action for U.S. Appl. No. 12/961,461; Applicant: McAlister et al.; Date of Mailing: Jan. 17, 2012, 39 pages.

International Search Report and Written Opinion for Application No. PCT/US2011/024778 Applicant: McAlister Technologies, LLC.; Date of Mailing: Sep. 27, 2011 (10 pages).

* cited by examiner

FUEL INJECTOR ASSEMBLIES HAVING ACOUSTICAL FORCE MODIFIERS AND ASSOCIATED METHODS OF USE AND MANUFACTURE

CROSS-REFERENCE TO RELATED APPLICATION(S)

The present application claims priority to and the benefit of U.S. Patent Application No. 61/304,403, filed on Feb. 13, 2010 and titled FULL SPECTRUM ENERGY AND RESOURCE INDEPENDENCE, and U.S. Patent Application No. 61/407,437, filed on Oct. 27, 2010 and titled FUEL INJECTOR SUITABLE FOR INJECTING A PLURALITY OF DIFFERENT FUELS INTO A COMBUSTION CHAMBER. Each of these applications is incorporated herein by reference in its entirety. To the extent the foregoing application and/or any other materials incorporated herein by reference conflict with the disclosure presented herein, the disclosure herein controls.

TECHNICAL FIELD

The following disclosure relates generally to fuel injectors for injecting fuel into a combustion chamber and, more specifically, to fuel injector assemblies having acoustical force modifiers.

BACKGROUND

Fuel injection systems are typically used to inject a fuel spray into an inlet manifold or a combustion chamber of an engine. Fuel injection systems have become the primary fuel delivery system used in automotive engines, having almost completely replaced carburetors since the late 1980s. Fuel injectors used in these fuel injection systems are generally capable of two basic functions. First, they deliver a metered amount of fuel for each inlet stroke of the engine so that a suitable air-fuel ratio can be maintained for the fuel combustion. Second, they disperse the fuel to improve the efficiency of the combustion process. Conventional fuel injection systems are typically connected to a pressurized fuel supply, and the fuel can be metered into the combustion chamber by varying the time for which the injectors are open. The fuel can also be dispersed into the combustion chamber by forcing the fuel through a small orifice in the injectors.

DETAILED DESCRIPTION

Figure 1:
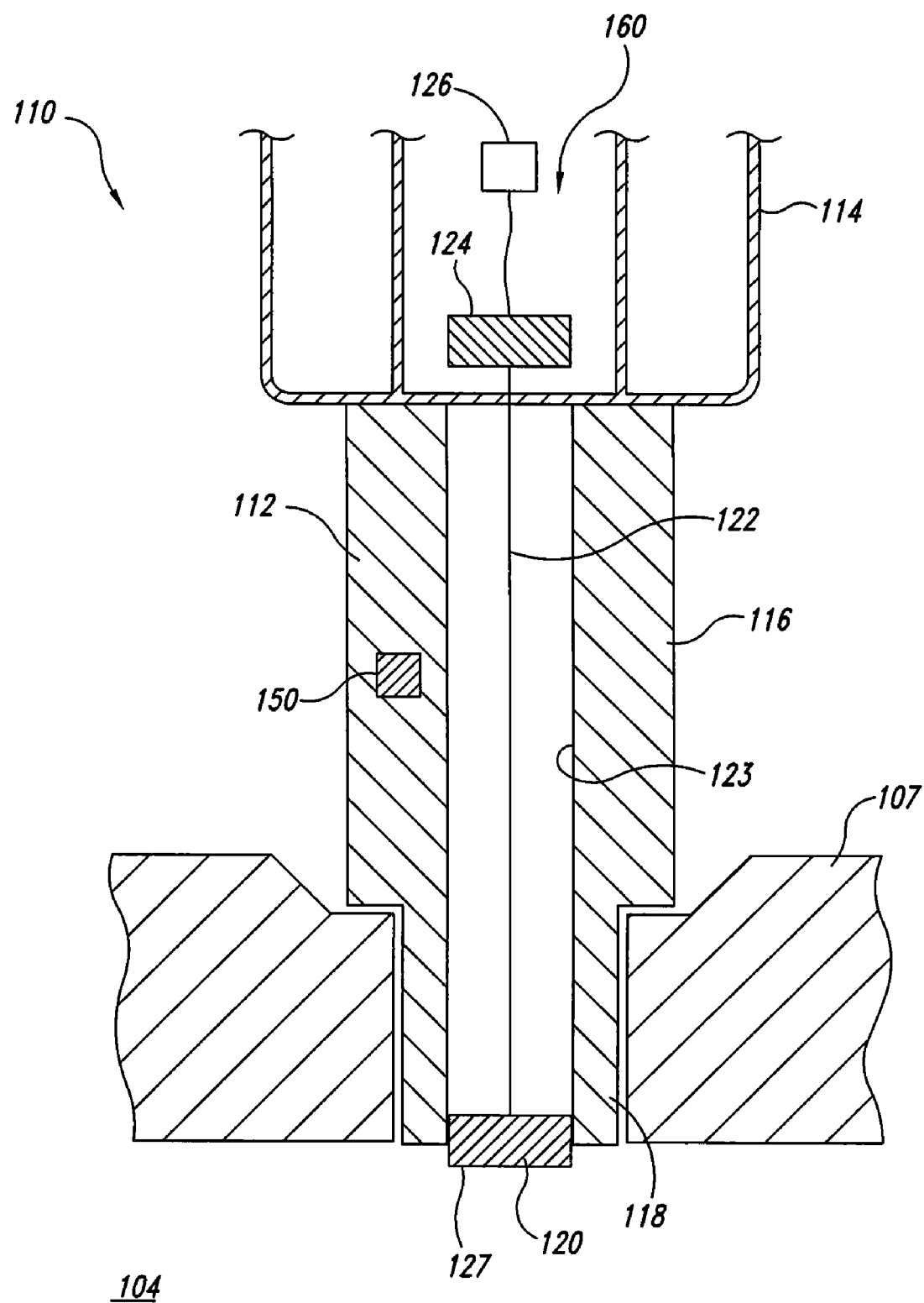
FIG. 1 is a schematic cross-sectional side view of an injector configured in accordance with an embodiment of the disclosure.

The present application incorporates by reference in their entirety the subject matter of each of the following U.S. Patent Applications:

U.S. Provisional Application No. 61/237,466, filed Aug. 27, 2009 and titled MULTIFUEL MULTIBURST; U.S. Provisional Application No. 61/312,100, filed Mar. 9, 2010 and titled SYSTEM AND METHOD FOR PROVIDING HIGH VOLTAGE RF SHIELDING, FOR EXAMPLE, FOR USE WITH A FUEL INJECTOR; U.S. patent application Ser. No. 12/653,085, filed Dec. 7, 2009 and titled INTEGRATED FUEL INJECTORS AND IGNITERS AND ASSOCIATED METHODS OF USE AND MANUFACTURE; U.S. patent application Ser. No. 12/841,170, filed Jul. 21, 2010 and titled INTEGRATED FUEL INJECTORS AND IGNITERS AND ASSOCIATED METHODS OF USE AND MANUFACTURE; U.S. patent application Ser. No. 12/804,510, filed Jul. 21, 2010 and titled FUEL INJECTOR ACTUATOR ASSEMBLIES AND ASSOCIATED METHODS OF USE AND MANUFACTURE; U.S. patent application Ser. No. 12/841,146, filed Jul. 21, 2010 and titled INTEGRATED FUEL INJECTOR IGNITERS WITH CONDUCTIVE CABLE ASSEMBLIES; U.S. patent application Ser. No. 12/841,149, filed Jul. 21, 2010 and titled SHAPING A FUEL CHARGE IN A COMBUSTION CHAMBER WITH MULTIPLE DRIVERS AND/OR IONIZATION CONTROL; U.S. patent application Ser. No. 12/841,135, filed Jul. 21, 2010 and titled CERAMIC INSULATOR AND METHODS OF USE AND MANUFACTURE THEREOF; U.S. patent application Ser. No. 12/804,509, filed Jul. 21, 2010 and titled METHOD AND SYSTEM OF THERMOCHEMICAL REGENERATION TO PROVIDE OXYGENATED FUEL, FOR EXAMPLE, WITH FUEL-COOLED FUEL INJECTORS; U.S. patent application Ser. No. 12/804,508, filed Jul. 21, 2010 and titled METHODS AND SYSTEMS FOR REDUCING THE FORMATION OF OXIDES OF NITROGEN DURING COMBUSTION IN ENGINES; U.S. patent application Ser. No. 12/913,744, filed Oct. 27, 2010 and titled INTEGRATED FUEL INJECTOR IGNITERS SUITABLE FOR LARGE ENGINE APPLICATIONS AND ASSOCIATED METHODS OF USE AND MANUFACTURE; U.S. patent application Ser. No. 12/913,749, filed Oct. 27, 2010 and titled ADAPTIVE CONTROL SYSTEM FOR FUEL INJECTORS AND IGNITERS; U.S. patent application Ser. No. 12/961,461, filed Dec. 6, 2010 and titled INTEGRATED FUEL INJECTOR IGNITERS CONFIGURED TO INJECT MULTIPLE FUELS AND/OR COOLANTS AND ASSOCIATED METHODS OF USE AND MANUFACTURE; and U.S. patent application Ser. No. 12/961,453, filed Dec. 6, 2010 and titled INTEGRATED FUEL INJECTOR IGNITERS HAVING FORCE GENERATING ASSEMBLIES FOR INJECTING AND IGNITING FUEL AND ASSOCIATED METHODS OF USE AND MANUFACTURE.

The present application also incorporates by reference in their entirety the subject matter of the following U.S. Patent Applications, filed concurrently herewith on Feb. 14, 2011 and titled METHODS AND SYSTEMS FOR ADAPTIVELY COOLING COMBUSTION CHAMBERS IN ENGINES Ser. No. 13/027,170 and MULTI-PURPOSE RENEWABLE FUEL FOR ISOLATING CONTAMINANTS AND STORING ENERGY Ser. No. 13/027,197.

The present disclosure describes devices, systems, and methods for providing a fuel injector configured to impart or modify acoustical forces to induce vibration in various types of fuels to affect fuel propagation patterns and fuel dispersal into a combustion chamber. The disclosure further describes associated systems, assemblies, components, and methods regarding the same. For example, several of the embodiments described below are directed generally to adaptable fuel injectors/igniters that can optimize the injection, ignition, and combustion of various fuels based on combustion chamber conditions, engine load requirements, etc. Certain details are set forth in the following description and in FIGS. 1-5E to provide a thorough understanding of various embodiments of the disclosure. However, other details describing well-known structures and systems often associated with internal combustion engines, injectors, igniters, and/or other aspects of combustion systems are not set forth below to avoid unnecessarily obscuring the description of various embodiments of the disclosure. Thus, it will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the disclosure.

Many of the details, dimensions, angles, shapes, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the claimed disclosure.

FIG. 1 is a schematic cross-sectional side view of an injector 110 configured in accordance with an embodiment of the disclosure. The injector 110 is configured to inject fuel into a combustion chamber 104 and to adaptively adjust the shape, pattern, phase, and/or frequency of fuel injections or bursts. The injector 110 can adaptively control these characteristics of the injected fuel via vibrations induced by an acoustical force generator or modifier 150 to enhance rapid ignition and complete combustion. The acoustical force modifier 150 is schematically illustrated in FIG. 1 and can be positioned at any location on the injector 110 and coupled to any of the features described in detail below. Moreover, in certain embodiments the acoustical force modifier 150 can be integral with one or more of the valve-actuating components described in detail below. Furthermore, although several of the additional features of the illustrated injector 110 described below are shown schematically for purposes of illustration, several of these schematically illustrated features are described in detail below with reference to various features of embodiments of the disclosure. Accordingly, the relative location, position, size, orientation, etc. of the schematically illustrated components of the Figures are not intended to limit the present disclosure.

In the illustrated embodiment, the injector 110 includes a casing or body 112 having a middle portion 116 extending between a base portion 114 and a nozzle portion 118. The nozzle portion 118 extends at least partially through a port in an engine head 107 to position the nozzle portion 118 at the interface with the combustion chamber 104. The injector 110 further includes a fuel passage or channel 123 extending through the body 112 from the base portion 114 to the nozzle portion 118. The channel 123 is configured to allow fuel to flow through the body 112. The channel 123 is also configured to allow other components, such as a valve operator assembly 160, an actuator 122, instrumentation components, and/or energy source components of the injector 110, to pass through the body 112. According to additional features of the illustrated embodiment, the nozzle portion 118 can include one or more ignition features for generating an ignition event for igniting the fuel in the combustion chamber 104. For example, the injector 110 can include any of the ignition features disclosed in U.S. patent application Ser. No. 12/841,170 entitled INTEGRATED FUEL INJECTORS AND IGNITERS AND ASSOCIATED METHODS OF USE AND MANUFACTURE, which is incorporated herein by reference in its entirety.

In certain embodiments, the actuator 122 can be a cable, stiffened cable, or rod that has a first end portion that is operatively coupled to a flow control device or valve 120 carried by the nozzle portion 118. The actuator 122 can be integral with the valve 120 or a separate component from the valve 120. As such, the valve 120 is positioned proximate to the interface with the combustion chamber 104. Although not shown in FIG. 1, in certain embodiments the injector 110 can include more than one flow valve, as well as one or more check valves positioned proximate to the combustion chamber 104, as well as at other locations on the body 112. For example, the injector 110 can include any of the valves and associated valve actuation assemblies as disclosed in the patent applications incorporated by reference above.

The position of the valve 120 can be controlled by the valve operator assembly 160. For example, the valve operator assembly 160 can include a plunger or driver 124 that is operatively coupled to the actuator 122. The actuator 122 and/or driver 124 can further be coupled to a processor or controller 126. As explained in detail below with reference to various embodiments of the disclosure, the driver 124 and/or actuator 122 can be responsive to the controller 126 as well as to the acoustical force modifier 150. The controller 126 can be positioned on the injector 110 or remotely from the injector 110. The controller 126 and/or the driver 124 are configured to rapidly and precisely actuate the actuator 122 to inject fuel into the combustion chamber 104 by moving the flow valve 120 via the actuator 122. For example, in certain embodiments, the flow valve 120 can move outwardly (e.g., toward the combustion chamber 104) and in other embodiments the flow valve 120 can move inwardly (e.g., away from the combustion chamber 104) to meter and control injection of the fuel. Moreover, the driver 124 can tension the actuator 122 to retain the flow valve 120 in a closed or seated position, and the driver 124 can relax or relieve the tension in the actuator 122 to allow the flow valve 120 to inject fuel, and vice versa. In other embodiments, the valve 120 may be opened and closed depending on the pressure of the fuel in the body 112, without the use of an actuator cable or rod. Additionally, although only a single valve 120 is shown at the interface of the combustion chamber 104, in other embodiments the flow valve 120 can be positioned at other locations on the injector 110 and can be actuated in combination with one or more other flow valves or check valves.

The injector 110 can further include a sensor and/or transmitting component 127 for detecting and relaying combustion chamber properties such as temperatures and pressure and providing feedback to the controller 126. The sensor 127 can be integral to the valve 120, the actuator 122, and/or the nozzle portion 118 or a separate component that is carried by any of these portions of the injector 110. In one embodiment, the actuator 122 can be formed from fiber optic cables or insulated transducers integrated within a rod or cable, or can include other sensors to detect and communicate combustion chamber data. Although not shown in FIG. 1, in other embodiments, the injector 110 can include other sensors or monitoring instrumentation located at various positions on the injector 110. For example, the body 112 can include optical fibers integrated into the material of the body 112. In addition, the flow valve 120 can be configured to sense or carry sensors to transmit combustion data to one or more controllers 126 associated with the injector 110. This data can be transmitted via wireless, wired, optical, or other transmission mediums to the controller 126 or other components. Such feedback enables extremely rapid and adaptive adjustments for desired fuel injection factors and characteristics including, for example, frequency of acoustical vibrations, fuel delivery pressure, fuel injection initiation timing, fuel injection durations for production of multiple layered or stratified charges, combustion chamber pressure and/or temperature, the timing of one, multiple or continuous plasma ignitions or capacitive discharges, etc. For example, the sensor 127 can provide feedback to the controller 126 as to whether the measurable conditions within the combustion chamber 104, such as temperature or pressure, fall within ranges that have been predetermined to provide desired combustion efficiency. Based on this feedback, the controller 126 in turn can direct the acoustical modifier 150 to manipulate the frequency of fuel and/or air movement in the combustion chamber 104.

During operation, as fuel is injected into the combustion chamber 104 it has an innate acoustical frequency of movement. As discussed in further detail below, acoustical frequency includes sub-audible, audible, and ultrasonic frequencies. The innate frequency of the fuel is dependent on numerous factors including, for example, the geometry of the combustion chamber and the valve opening, the mechanism of actuating the valve, the piston position and speed, and the type, temperature, velocity, pressure, density, and viscosity of the fuel. As discussed above, the pattern, dispersion, and movement of the fuel in the combustion chamber 104 affects the ignition and combustion efficiency of the system. Specifically, the frequency and shape, pattern, and/or phase of fuel injection spray determines the admixture of fuel and air in the combustion chamber 104, thereby controlling the initiation, rate, efficiency, and temperature of ignition events. The innate frequency can be altered via a cyclic impartation of energy to the fuel or air, as well as to one or more components in the fuel injection system. Imparting this acoustical energy alters the fuel pattern, shape, phase, and/or frequency to provide for improved fuel/air ratios. This reactive, responsive control over the fuel movement provides for a more efficient combustion system as compared to uncontrolled, unadaptive configurations.

The acoustical force modifier 150 can take on numerous forms according to different embodiments of the disclosure and can apply acoustical energy to the valve driver 124, the actuator 122, the valve 120, fuel in the injector body, fuel in the combustion chamber 104, air, a mixture of fuel and air, and/or to other components of the injector 110. The energy applied to any of these components can result in an altered acoustical frequency of the fuel and/or air in the combustion chamber. In one embodiment, the acoustical force modifier 150 can be configured to achieve the desired frequency and pattern of the injected fuel bursts by applying energy to induce vibrations in the valve driver 124 to alter the frequency and degree to which the valve 120 is opened. This in turn alters the acoustical energy of the fuel that is introduced into the combustion chamber 104, because the fuel frequency is dependent on the frequency of valve opening. The acoustical force modifier 150 can be coupled to a voltage source or other suitable energy source (not shown), as well as to the controller 126. In certain embodiments, the acoustical force modifier 150 can be a solenoid winding that is an electromagnetic force generator, a piezoelectric force generator, a pneumatic force generator, a hydraulic force generator, a magnetostrictive force generator, or other suitable type of force generator for moving the driver 124.

In another embodiment, the acoustical force modifier 150 applies energy directly to the actuator 122 by any of the means described above. The energy causes vibrational capacitive ringing of the actuator 122. The actuator 122 in turn opens the valve 120 in a rhythm corresponding to this vibration, thereby altering the fuel distribution pattern by imparting acoustical forces or energy to the fuel. In still further embodiments (as described in further detail below with reference to FIG. 2), the acoustical force modifier 150 can alter the frequency of the flow valve 120 actuation to induce plasma projection to beneficially affect the shape and/or pattern of the injected fuel.

In some embodiments, the acoustical force modifier 150 applies energy directly to the valve 120, to the fuel via the valve 120, or to fuel, air, and/or fuel and air in the body 112 or combustion chamber 104. For example, acoustical energy can be applied directly to the fuel via an acoustical force modifier 150 that is a component of the injector body 112. In such an embodiment, vibrations can be induced to alter the state of the fuel and/or alter the fuel spray in the combustion chamber. For example, in one embodiment, a first frequency can be applied to a fuel, such as a colloidal architectural construct fuel, to effect fuel characteristic or state changes; then a second frequency can be applied to the fuel to manipulate the frequency, shape, pressure, etc. of the fuel entering the combustion chamber. The second frequency can either be the same as or different from the first frequency, and can be induced by the same or a different acoustical force modifier as the acoustical force modifier that alters the fuel characteristic. Inducing vibrations in fuel in the injector body may be desirable for various types of fuels, including one or more of those described in the application titled MULTI-PURPOSE RENEWABLE FUEL FOR ISOLATING CONTAMINANTS AND STORING ENERGY Ser. No. 13/311,434, which has been incorporated herein by reference.

In another embodiment, the combination of the shape of a valve, valve seat, and/or valve orifice and the pressure drop of the fuel passing through the valve 120 into the combustion chamber 104 instigates an acoustical disturbance that alters the frequency of fuel being dispersed into the combustion chamber 104, and accordingly controls the spray pattern of the fuel and the combustion efficiency. In one embodiment, the valve 120 is a reed valve that is responsive to pressurized fuel and acoustical vibrations in the fuel. In another embodiment, energy is applied to fuel in the body 112, and the valve 120 can be made to rotate, translate, or otherwise open from the pressure or movement of the fuel in the injector body 112.

In certain embodiments, the vibrational frequencies applied to the fuel can be sub-audible frequencies (e.g., less than approximately 20 Hz) or ultrasound frequencies (e.g., above approximately 20,000 Hz). In other embodiments, the frequencies can be audible frequencies ranging from about 20 Hz to about 20,000 Hz. The acoustical energy vibrational frequency can be selected based on several factors including the properties of the injector and combustion chamber, as well as fuel type, pressure, temperature, flow rate, etc. For example, a fuel having a relatively high molecular weight may require a relatively higher acoustical energy vibrational frequency applied to the fuel to more quickly initiate and complete combustion. In another embodiment, applying a high frequency, for example a frequency of approximately 2,450 MHz, induces dipolar molecular motion in low-cost fuels having a water component, such as wet alcohol. Such high frequency molecular motion may be generated by an AC or DC microwave driver and may be utilized in conjunction with one or more additional vibrational drivers at other frequencies. The selected acoustical energy vibrational frequency can also be at least partially based on feedback from the combustion chamber properties (e.g., temperature, pressure, amount of fuel, oxygen, or oxides of nitrogen, ignition initiation and completion, etc.) that can be read by the sensors or detectors described above.

In the embodiments described herein, movement of the fuel, air, and/or fuel and air mixtures in the combustion chamber can be controlled or altered through use of the acoustical force modifier 150. In some embodiments, more than one acoustical force modifier is used in order to more finely tune control over the frequency of fuel and/or air movement. Furthermore, the acoustical force modifier 150 can be used in conjunction with other devices, mechanisms, or methods. For example, in one embodiment, the acoustical force modifier 150 can be used with fuel that has been highly pressurized in a fuel supply tank (not shown) in order to more finely tune control over the frequency of fuel movement.

The features of the injector 110 described above with reference to FIG. 1 can be included in any of the embodiments described below with reference to FIGS. 2-5E or in other embodiments of fuel injectors that have been described in publications that have been incorporated by reference herein. Furthermore, some or all of the features of the injector 110 and/or acoustical force modifier 150 can be used with a wide variety of engines including, but not limited to, two-stroke and four-stroke piston engines, rotary combustion engines, gas turbine engines, or combinations of these. The injector 110 and/or acoustical force modifier 150 can likewise be used with a wide variety of fuel types including diesel, gasoline, natural gas (including methane, ethane, and propane), renewable fuels (including fuel alcohols—both wet and dry—and nitrogenous fuels such as ammonia), and designer fuels, such as those described in the patent application filed herewith and titled MULTI-PURPOSE RENEWABLE FUEL FOR ISOLATING CONTAMINANTS AND STORING ENERGY Ser. No. 13/027,197, which has been incorporated by reference herein in its entirety.

Figure 2:
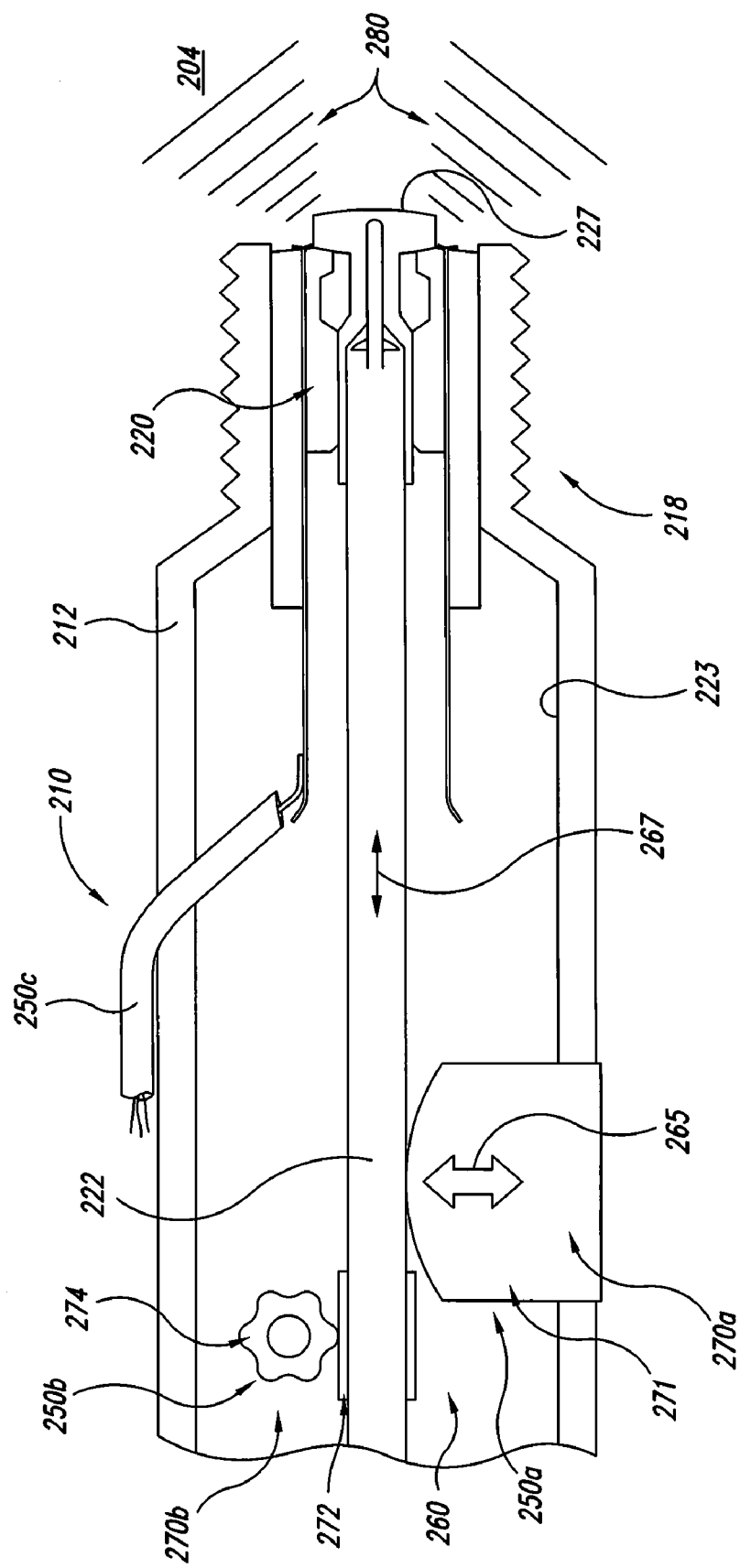
FIG. 2 is a schematic cross-sectional side partial view of an injector configured in accordance with another embodiment of the disclosure.

FIG. 2 is a cross-sectional side partial view of an injector 210 configured in accordance with another embodiment of the disclosure. The injector 210 is configured to adaptively impart acoustical energy and rapidly and precisely control the actuation of a flow valve 220 to release fuel into a combustion chamber 204. The illustrated injector 210 includes several features that are generally similar in structure and function to the corresponding features of the injector 110 disclosed above with reference to FIG. 1. For example, as shown in FIG. 2, the injector 210 includes a body 212 having a fuel passageway 223, a nozzle portion 218, and a cable or actuator 222 coupled to the flow valve 220. The position of the valve 220 can be controlled by a valve operator assembly 260. The valve operator assembly 260 can include one or more acoustical force generators or modifiers 250 (identified individually as first acoustical force modifier 250a, second acoustical force modifier 250b, and third acoustical force modifier 250c) for imparting acoustical energy. The injector 210 can further include one or more sensors and/or transmitting components 227. In the illustrated embodiment, the sensor 227 is located on the nozzle portion 218, but may be located in alternate locations on the injector 210 as described above with reference to FIG. 1. For example, in other embodiments, the nozzle portion 218 can include one or more piezo crystals able to detect combustion events. The acoustical force modifiers 250 can include corresponding actuation assemblies 270 (identified individually as first actuation assembly 270a and a second actuation assembly 270b) for moving the actuator 222 axially along the injector 210 (e.g., in the direction of a first arrow 267) to open and close the valve 220.

The first acoustical force modifier 250a can include a piezoelectric, electromechanical, pneumatic, hydraulic, or other suitable force-generating component 271. When the force modifier 250a is energized or otherwise actuated, the actuation assembly 270a moves in a direction generally perpendicular to a longitudinal axis of the injector 210 (e.g., in the direction of a second arrow 265). Accordingly, the first acoustical force modifier 250a causes the first actuation assembly 270a (shown schematically as a drummer mechanism) to contact and displace at least a portion of the actuator 222 to cyclically tension the actuator 222 to close the valve 220. When the acoustical force modifier 250a is no longer energized or actuated, the actuator 222 is no longer in tension. Accordingly, the first actuation assembly 270a can provide for very rapid and precise actuator 222 and valve 220 displacement, thereby precisely propagating acoustical energy via pressure waves 280 through fuel and/or air in the combustion chamber (or to other actuating components of the injector 210). These precise pressure waves 280 alter the frequency, shape, pattern, and/or phase of fuel injection bursts from the flow valve 220 into the combustion chamber 204. As described above, the acoustically altered pattern of fuel bursts can provide for improved fuel/air mixtures and accordingly increased combustion efficiency.

The second actuation assembly 270b (shown schematically) includes a rack-and-pinion type actuation assembly 270b for moving the actuator 222 axially within the injector 210. More specifically, the second actuation assembly 270b includes a rack or sleeve 272 coupled to the actuator 222. A corresponding pinion or gear 274 engages the sleeve 272. In operation, the second acoustical force modifier 250b causes the second actuation assembly 270b to transfer the rotational movement of the gear 274 into linear motion of the sleeve 272, and consequently move the actuator 222. As with the first acoustical force modifier 250a, the second acoustical force modifier 250b can provide for rapid and precise actuator 222 and valve 220 displacement, thereby altering and improving the resulting fuel distribution pattern and frequency by imparting acoustical energy.

The third acoustical force modifier 250c can include means to form a plasma of ionized air to ignite fuel. For example, the third acoustical force modifier 250c can alter the frequency of the flow valve 220 actuation to induce plasma projection to beneficially affect the frequency, phase, shape, and/or pattern of the injected fuel. U.S. Patent Application Publication No. 672,636, (U.S. Pat. No. 4,122,816), which is incorporated herein by reference in its entirety, describes suitable drivers for actuating plasma projection by injector 210 and other injectors described herein. The plasma projection of ionized air can accelerate the combustion of fuel that enters the plasma. Moreover, this plasma projection can affect the shape of the rapidly combusting fuel according to predetermined combustion chamber characteristics. Similarly, the injector 210 can also ionize portions of the fuel to produce high-energy plasma, which can also affect or change the shape of the distribution pattern of the combusting fuel. In some embodiments, the injector 210 can further tailor the properties of the combustion and distribution of injected fuel by creating supercavitation or sudden gasification of the injected fuel. More specifically, the force modifier 250c can actuate the flow valve 220 and/or other components of the nozzle portion 218 in such a way as to create sudden gasification of the fuel flowing past these components. For example, the frequency of the opening and closing of the flow valve 220 can induce sudden gasification of the injected fuel. This sudden gasification produces gas or vapor from the rapidly entering liquid fuel, or mixtures of liquid and solid fuel constituents. For example, this sudden gasification can produce a vapor as liquid fuel that is routed around the surface of the flow valve 220 to enter the combustion chamber 204. The sudden gasification of the fuel enables the injected fuel to combust much more quickly and completely than non-gasified fuel. Moreover, the sudden gasification of the injected fuel can produce different fuel injection patterns or shapes including, for example, projected ellipsoids, which differ greatly from generally coniform patterns of conventional injected fuel patterns. In still further embodiments, the sudden gasification of the injected fuel may be utilized with various other fuel ignition and combustion enhancing techniques. For example, the sudden gasification can be combined with superheating of liquid fuels, plasma and/or acoustical impetus of projected fuel bursts. Ignition of these enhanced fuel bursts requires far less catalyst, as well as catalytic area, when compared with catalytic ignition of liquid fuel constituents. While the third acoustical force modifier 250c is depicted schematically in FIG. 2 as a fluid passageway, it can take on other forms or configurations, as described in further detail in application Ser. No. 12/841,170, filed Jul. 21, 2010 and titled INTEGRATED FUEL INJECTORS AND ASSOCIATED METHODS OF USE AND MANUFACTURE, which is herein incorporated by reference in its entirety.

Although the embodiment illustrated in FIG. 2 includes multiple acoustical force modifiers 250, in other embodiments there can be more or fewer acoustical force modifiers 250, and the types of acoustical force modifiers 250 can vary in their combinations. The choice of how many and what type of acoustical force modifier to use can depend on the spacing, mechanics, and configuration of the injector 210, in addition to how much acoustical modification needs to take place in the system. In some cases, multiple acoustical force modifiers can be used in combination in order to fine-tune the energy applied and the resulting fuel/air pattern, phase, shape, and/or frequency in the combustion chamber 204.

Figure 3:
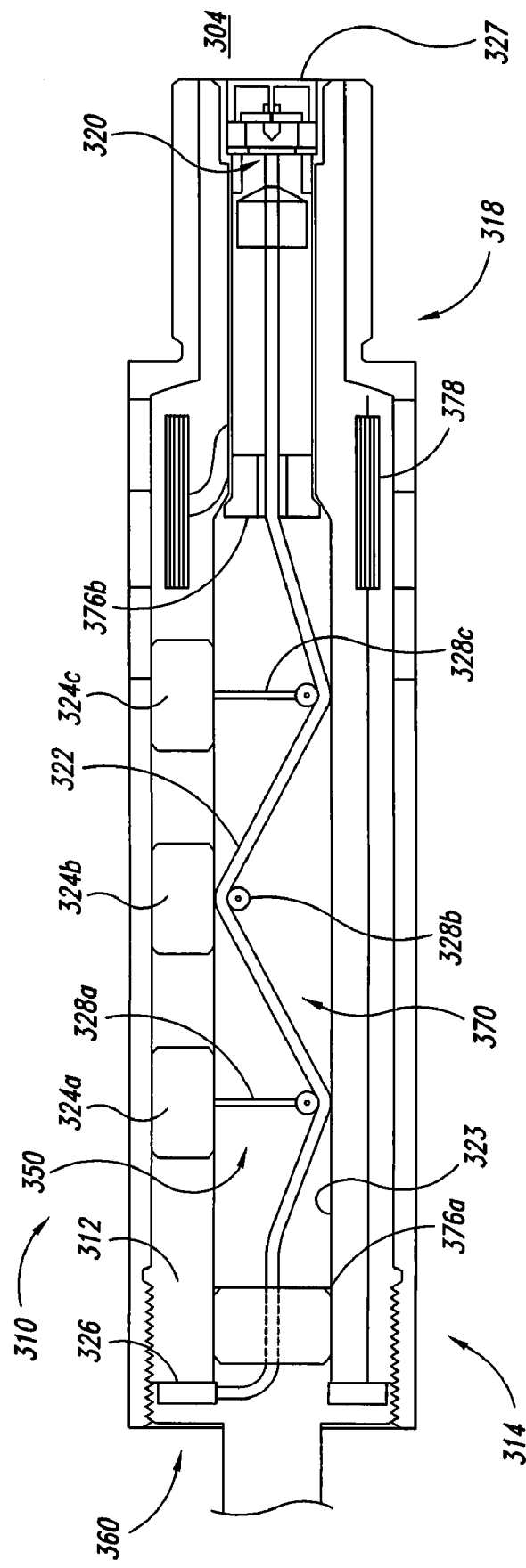
FIG. 3 is a schematic cross-sectional side partial view of an injector configured in accordance with another embodiment of the disclosure.

FIG. 3 is a cross-sectional side partial view of an injector 310 configured in accordance with another embodiment of the disclosure. The injector 310 can be configured to adaptively impart acoustical energy and rapidly and precisely control the actuation of a flow valve 320 to release fuel into a combustion chamber 304. The illustrated injector 310 includes several features that are generally similar in structure and function to the corresponding features of the injectors disclosed above with reference to FIGS. 1 and 2. As shown in FIG. 3, the injector 310 includes a body 312 having a base portion 314, a fuel passageway 323 extending through the body 312, a nozzle portion 318, and a cable or actuator 322 coupled to the flow valve 320. The position of the valve 320 can be controlled by a valve operator assembly 360. The valve operator assembly 360 can include a sensor and/or transmitting component 327 and an acoustical force modifier 350. In the illustrated embodiment, the sensor 327 is located on the nozzle portion 318, but may be located in alternate locations on the injector 310 as described above with reference to FIG. 1. The acoustical force modifier 350 includes an actuation assembly 370 that is configured to move the actuator 322 to open and close the flow valve 320. More specifically, the actuation assembly 370 includes actuation drivers 324 (identified individually as first-third drivers 324a-324c) that are configured to displace the actuator 322. Although three drivers 324a-324c are illustrated in FIG. 3, in other embodiments the injector 310 can include a single driver 324, two drivers 324, or more than three drivers 324. The drivers 324 can be piezoelectric, electromechanical, pneumatic, hydraulic, or other suitable force-modifying components.

The actuation assembly 370 also includes connectors 328 (identified individually as first-third connectors 328a-328c) operatively coupled to the corresponding drivers 324 and to the actuator 322 to provide push, pull, and/or push and pull displacement of the actuator 322. The actuator 322 can freely slide between the connectors 328 axially along the injector 310. According to another feature of the actuation assembly 370, a first end portion of the actuator 322 can pass through a first guide bearing 376a at the base portion 314 of the injector 310. An end portion of the actuator 322 can also be operatively coupled to a controller 326 to relay combustion data to the controller 326 to enable the controller 326 to adaptively control and optimize fuel injection and ignition processes. A second end portion of the actuator 322 can extend through a second guide bearing 376b at the nozzle portion 318 of the injector 310 to align the actuator 322 with the flow valve 320.

When the acoustical force modifier 350 is energized or otherwise actuated, the acoustical force modifier 350 causes the drivers 324 to displace the actuator 322 to tension or relax the actuator 322 for performing the desired degree of motion of the flow valve 320. More specifically, the drivers 324 cause the connectors to displace the actuator 322 in a direction that is generally perpendicular to the longitudinal axis of the injector 310. By using multiple drivers 324, the movement of the flow valve 320 can be finely tuned according to the desired modifications to the pattern, shape, phase, and/or acoustical frequency of the fuel and/or air movement in the combustion chamber 304.

The injector 310 can also include a capacitor 378 at the nozzle portion 318 that can be directed by the acoustical force modifier 350 to deliver relatively large current bursts of plasma at the combustion chamber interface by ionizing fuel, air, or fuel-air mixtures. The capacitor 378 may be cylindrical to include many conductive layers such as may be provided by a suitable metal selection or of graphene layers that are separated by a suitable insulator. The capacitor 378 may be charged and discharged via insulated cables that can be coupled to a suitable power source or a conductive tube or plating.

Figure 4:
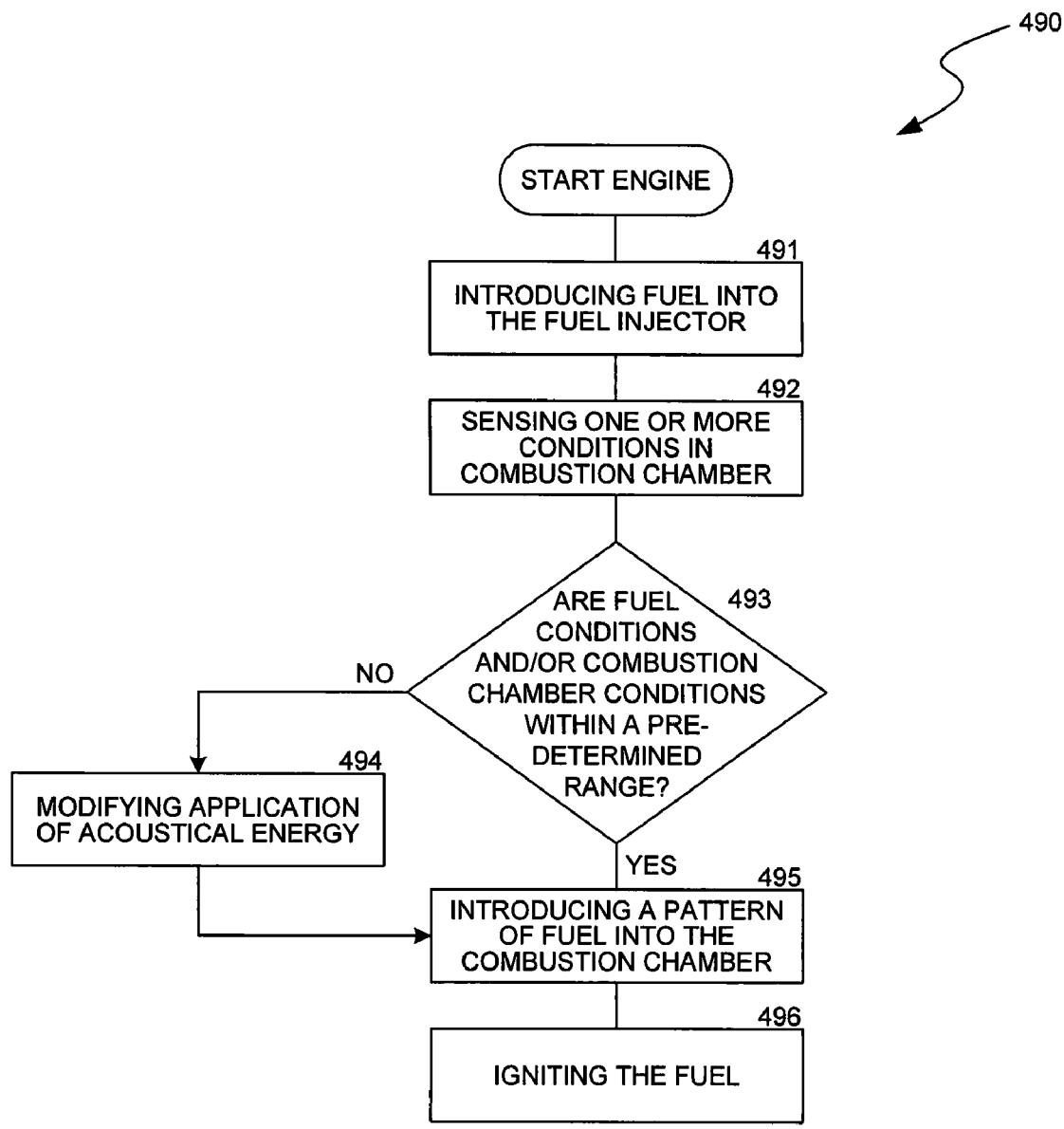
FIG. 4 is a flow diagram of a routine or method for operating a fuel injector in accordance with an embodiment of the disclosure.

FIG. 4 is a flow diagram of a routine or method 490 for operating a fuel injector including an acoustical force modifier configured in accordance with an embodiment of the disclosure. The routine 490 can be controlled or performed by an engine management computer, engine control unit, application-specific integrated circuit, processor, computer, and/or other suitable programmable engine control device. The method 490 can be used to monitor conditions in a combustion chamber into which fuel is being injected and adjust the energy applied to one or more components in the fuel injector, and in particular an acoustical force modifier, to alter the pattern, phase, shape, and/or acoustical frequency of fuel and/or air in the combustion chamber, thereby optimizing combustion efficiency.

For example, the method 490 includes introducing fuel into the fuel injector (block 491). The method can further include sensing one or more conditions in the combustion chamber (block 492). For example, the fuel injector can include a sensor and/or transmitting component that can read or sense various properties and conditions in the combustion chamber, such as temperature and pressure, and can provide feedback to a controller component of the programmable engine control device. Combustion data can be transmitted via wireless, wired, optical or other transmission mediums to the controller or other components, as described in detail above.

The method 490 additionally includes determining whether fuel conditions and/or conditions in the combustion chamber fall within a predetermined range (decision block 493). In certain embodiments, for example, it may be desirable to determine whether the temperature of the combustion chamber rises above 2,200 degrees C., which is the threshold for forming oxides of nitrogen. In other embodiments, it may be desirable to determine whether fuel, such as colloidal architectural construct fuel, has sufficiently broken down or changed state in the injector body. In still other embodiments, other predetermined temperatures, pressures, fuel properties, engine load or torque requirements, and associated properties and conditions can be used to adaptively control the injector.

When the system determines that the conditions in the combustion chamber fall outside of a predetermined range, the method includes acoustically modifying application of energy to the system (block 494). Specifically, the method can include altering the frequency, phase, shape, and/or pattern of fuel and/or air in the combustion chamber via a cyclic impartation of energy to one or more components in the fuel injection system. For example, if the feedback from the sensor indicates that combustion is being completed inefficiently or that the combustion chamber is excessively heated, the modification could comprise acoustically altering the fuel pattern to have an increased frequency of movement, allowing more optimal fuel/air mixtures in the combustion chamber, fewer hot spots, and more efficient combustion. Modifying the application of acoustic energy can include any of the mechanisms described above with reference to FIGS. 1-3. The acoustical force modifier can take on numerous forms in different embodiments of the disclosure and can apply energy to a valve driver, to an actuator, to a valve, directly to the fuel, to air in the injector or combustion chamber, to a mixture of fuel and air, or to other components in the fuel injector system. In certain embodiments, the acoustical force modifier can be a solenoid winding that is an electromagnetic force generator, a piezoelectric force generator, a magnetostrictive force generator, or other suitable type of force generator for moving the component.

The method can further include introducing a pattern of fuel into the combustion chamber (block 495) and igniting the fuel (block 496). As described in detail above with reference to FIGS. 1-3, the application of acoustical energy to one or more components in the fuel injector modifies the combustion efficiency of the system. Specifically, the frequency and spray pattern of fuel injection bursts control the initiation, rate, efficiency, and temperature of ignition events in the combustion chamber. When acoustical energy is applied, it modifies the innate frequency and pattern of movement of fuel and/or air. This modification produces a spray pattern of fuel that more effectively and efficiently ignites and combusts the fuel, thus producing less wasted energy and fuel. In one embodiment, based on the sensor feedback, the acoustical energy can be applied in any of the means or components described above to accelerate the fuel at the beginning and end of combustion. In some embodiments, all or portions of the method 490 are repeated to fine-tune the injection frequency and pattern of fuel in the combustion chamber and/or to continuously monitor and improve combustion efficiency.

Figure 5A:
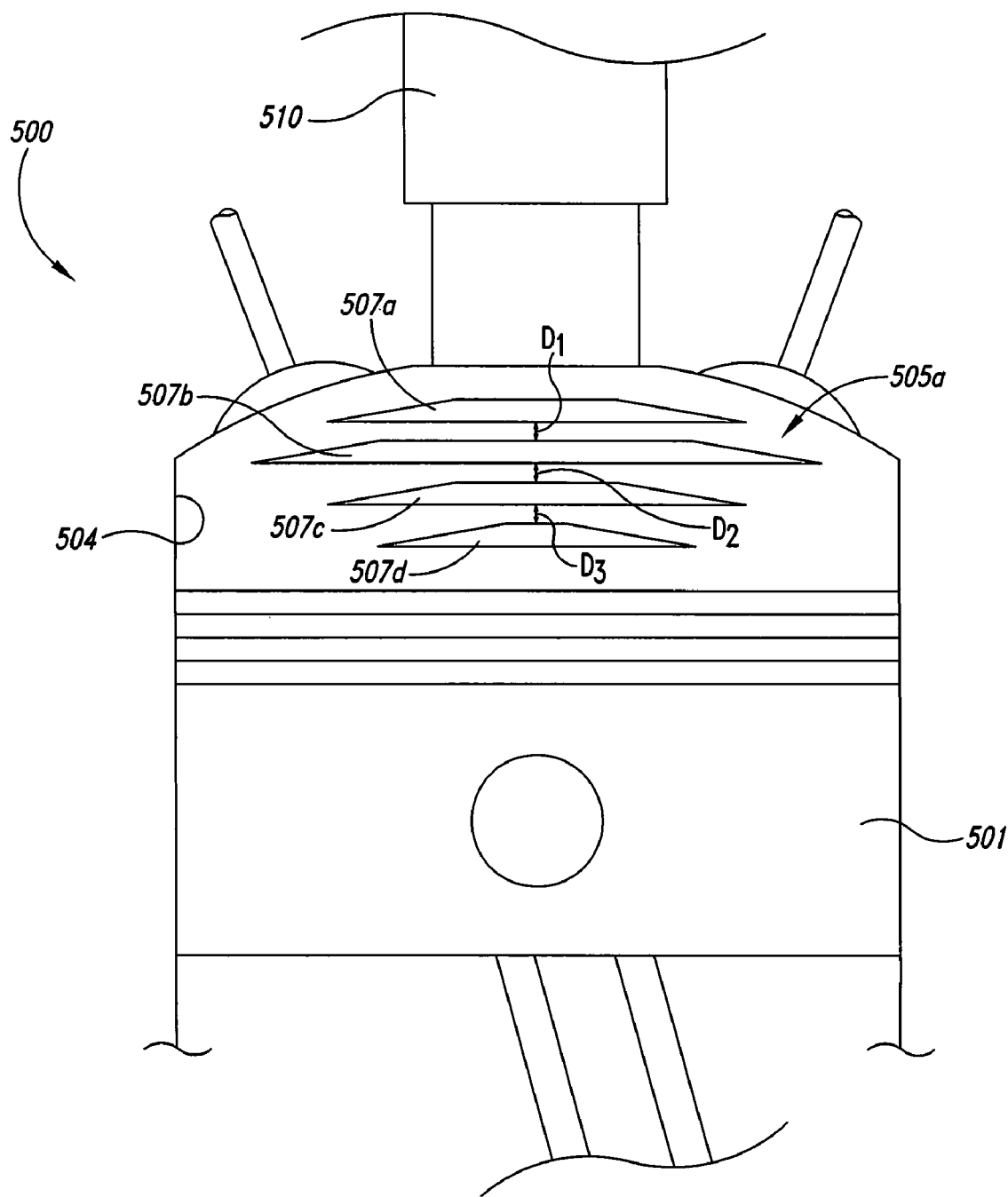
FIG. 5A is a schematic cross-sectional side view of a portion of a fuel delivery system configured in accordance with an embodiment of the disclosure.
Figure 5B:
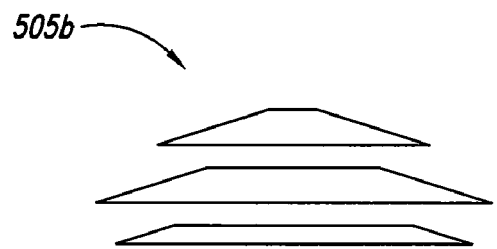
FIGS. 5B-5E illustrate several fuel burst patterns that can be introduced by an injector configured in accordance with embodiments of the disclosure.
Figure 5C:
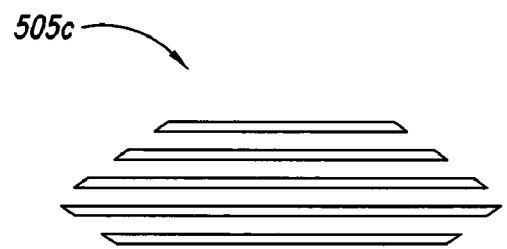
Figure 5D:
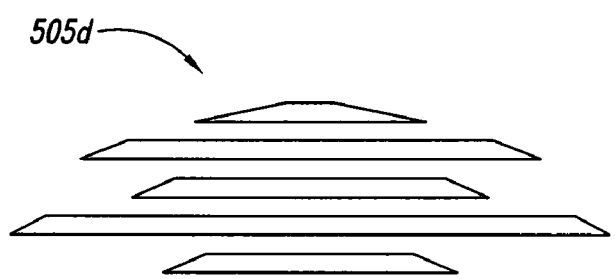
Figure 5E:
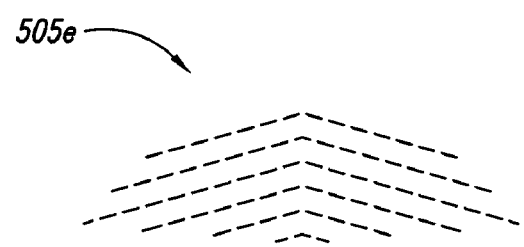

FIG. 5A is a schematic cross-sectional side view of a portion of a fuel delivery system 500 configured in accordance with an embodiment of the disclosure. The system 500 includes a fuel injector 510, a combustion chamber 504, and an energy transfer device or piston 501. The combustion chamber 504 is at least partially formed between a head portion, which contains the injector 510, and the movable piston 501. In other embodiments, however, the injector 510 can be used in other environments with other types of combustion chambers and/or energy-transferring devices. The injector 510 includes several features that are generally similar in structure and function to the corresponding features of the injectors described above with reference to FIGS. 1-4. For example, as described in greater detail below, the injector 510 includes several features that not only allow the injection and ignition of different fuels in the combustion chamber 504, but that also enable the injector 510 to acoustically modify the injection and ignite these different fuels according to different combustion conditions or requirements.

According to another aspect of the illustrated embodiment, the injector 510 can include instrumentation for sensing various properties of the combustion in the combustion chamber 504 (e.g., properties of the combustion process, the fuel, the combustion chamber 504, etc.). In response to these sensed conditions, the injector 510 can adaptively optimize via acoustical energy the fuel injection and ignition characteristics to achieve increased fuel efficiency and power production, as well as to decrease noise, engine knock, heat losses, and/or vibration to extend the engine and/or vehicle life. Specifically, the injector 510 includes one or more acoustical force modifiers that use the mechanisms described above with respect to FIGS. 1-4 to achieve specific flow or spray patterns of injected fuel 505*a*.

The acoustical force modifier can apply acoustical energy to induce vibrations in any fuel injector component, such as an injector body, valve actuation assembly, actuator, valve, fuel, and/or air. The applied acoustical frequency modifies and controls one or more of the frequency, shape, phase, and/or pattern of injected fuel 505*a*. Specifically, the frequency of individual fuel bursts 507 (identified individually as 507*a*-507*d*), the spacing between each burst 507 (identified individually as $D_1$-$D_3$), and the pattern/layering of bursts can be regulated by controlling the injected fuel 505*a* via an acoustical force modifier. For example, in one embodiment, the sensor can determine that the combustion chamber is running excessively hot and can direct the acoustical force modifier to apply vibration to increase or decrease valve actuation frequency. This in turn adjusts one or more distances $D_1$-$D_3$ between one or more of the bursts 507, thereby altering the available amount, surface-to-volume ratio, and/or location of fuel that can be mixed with oxygen to achieve combustion. This control over the injected fuel 505*a* accordingly provides the ability to achieve earlier initiation of ignition, more complete combustion, and faster completion of combustion.

FIGS. 5B-5E illustrate several patterns of injected fuel 505 (identified individually as patterns 505*b*-505*e*) that can be introduced by an injector configured in accordance with embodiments of the disclosure. More specifically, each pattern 505 includes multiple layers or portions of fuel that can be adaptively modified or controlled via the application of acoustical energy. As those of ordinary skill in the art will appreciate, the illustrated patterns 505 are merely representative of some embodiments of the present disclosure. Accordingly, the present disclosure is not limited to the patterns 505 shown in FIGS. 5A-5E, and in other embodiments injectors can dispense burst patterns that differ from the illustrated patterns 505. Although the patterns 505 illustrated in FIGS. 5A-5E have different shapes and configurations, these patterns 505 share the feature of having sequential or stratified fuel layers. The individual layers of the corresponding patterns 505 provide the benefit of relatively large surface-to-volume ratios of the injected fuel. These large surface-to-volume ratios provide higher combustion rates of the fuel charges, as well as assist in insulating and accelerating complete combustion of the fuel charges. Such fast and complete combustion provides several advantages over slower-burning fuel charges. For example, slower-burning fuel charges require earlier ignition, cause significant heat losses to combustion chamber surfaces, and produce more back work or output torque loss to overcome early pressure rise from the earlier ignition. Such previous combustion operations are also plagued by pollutive emissions (e.g., carbon-rich hydrocarbon particulates, oxides of nitrogen, carbon monoxide, carbon dioxide, quenched and unburned hydrocarbons, etc.) as well as harmful heating and wear of pistons, rings, cylinder walls, valves, and other components of the combustion chamber.

As described in some detail above, the disclosed fuel injectors and associated systems and methods provide several advantages and benefits. The injectors described herein allow the operator to very precisely meter the air/fuel ratio and arrangement by altering the pattern and frequency of the fuel bursts and/or air in the combustion chamber with acoustical energy. This decreases fuel and energy waste in the system. Also as described above, the acoustical control over the fuel and/or air can enable the operator to control the temperature and pressure in the combustion chamber. This can be useful to prevent the combustion chamber from operating at conditions that are detrimental to the overall system or that produce harmful emissions such as oxides of nitrogen. For example, acoustically controlling the temperature of the combustion chamber can reduce hot spots in the combustion chamber by eliminating fuel/air mixtures that accumulate and burn uncontrollably at higher temperatures than desired. Control over valve actuation frequency can increase metering valve rates and stabilize operation of the system. Furthermore, the operator can adaptively control the interval between injections and can accelerate the initiation and completion of combustion with the acoustical energy so that the combustion chamber does not accumulate excessive heat.

Any of the actuation-related components disclosed herein (including, but not limited to, actuators, drivers, sensors, valves, actuation assemblies, valve operator assemblies, and/or acoustical force modifiers) can be at least partially made from or coated in any number of suitable materials, including, for example, ultralight aerogels (as described in Jianhua Zou et al., *Ultralight Multiwalled Carbon Nanotube Aerogel,* 4 ACS NANO at 7293 (2010), which is hereby incorporated by reference in its entirety).

It will be apparent that various changes and modifications can be made without departing from the scope of the disclosure. Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

Features of the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the disclosure can be modified, if necessary, to employ fuel injectors and ignition devices with various configurations, and concepts of the various patents, applications, and publications to provide yet further embodiments of the disclosure.

These and other changes can be made to the disclosure in light of the above detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

To the extent not previously incorporated herein by reference, the present application incorporates by reference in their entirety the subject matter of each of the following materials: U.S. Patent Application No. 61/237,466, filed on Aug. 27, 2009 and titled MULTIFUEL MULTIBURST; U.S. Patent Application No. 60/626,021, filed on Nov. 9, 2004 and titled MULTIFUEL STORAGE, METERING AND IGNITION SYSTEM; U.S. patent application Ser. No. 12/006,774, filed on Jan. 7, 2008 and titled MULTIFUEL STORAGE, METERING AND IGNITION SYSTEM; U.S. patent application Ser. No. 12/581,825, filed on Oct. 19, 2009 and titled MULTIFUEL STORAGE, METERING AND IGNITION SYSTEM, U.S. Patent Application No. 61/312,100, filed on Mar. 9, 2010 and titled SYSTEM AND METHOD FOR PROVIDING HIGH VOLTAGE RF SHIELDING, FOR EXAMPLE, FOR USE WITH A FUEL INJECTOR; U.S. patent application Ser. No. 12/653,085, filed on Dec. 7, 2009 and titled INTEGRATED FUEL INJECTORS AND IGNITERS AND ASSOCIATED METHODS OF USE AND MANUFACTURE; U.S. patent application Ser. No. 12/841,170, filed on Jul. 21, 2010 and titled INTEGRATED FUEL INJECTORS AND IGNITERS AND ASSOCIATED METHODS OF USE AND MANUFACTURE; U.S. patent application Ser. No. 12/804,510, filed on Jul. 21, 2010 and titled FUEL INJECTOR ACTUATOR ASSEMBLIES AND ASSOCIATED METHODS OF USE AND MANUFACTURE; U.S. patent application Ser. No. 12/841,146, filed on Jul. 21, 2010 and titled INTEGRATED FUEL INJECTOR IGNITERS WITH CONDUCTIVE CABLE ASSEMBLIES; U.S. patent application Ser. No. 12/841,149, filed on Jul. 21, 2010 and titled SHAPING A FUEL CHARGE IN A COMBUSTION CHAMBER WITH MULTIPLE DRIVERS AND/OR IONIZATION CONTROL; U.S. patent application Ser. No. 12/841,135, filed on Jul. 21, 2010 and titled CERAMIC INSULATOR AND METHODS OF USE AND MANUFACTURE THEREOF; U.S. patent application Ser. No. 12/804,509, filed on Jul. 21, 2010 and titled METHOD AND SYSTEM OF THERMOCHEMICAL REGENERATION TO PROVIDE OXYGENATED FUEL, FOR EXAMPLE, WITH FUEL-COOLED FUEL INJECTORS; U.S. patent application Ser. No. 12/804,508, filed on Jul. 21, 2010 and titled METHODS AND SYSTEMS FOR REDUCING THE FORMATION OF OXIDES OF NITROGEN DURING COMBUSTION IN ENGINES; U.S. patent application Ser. No. 12/913,744, filed on Oct. 27, 2010 and titled INTEGRATED FUEL INJECTOR IGNITERS SUITABLE FOR LARGE ENGINE APPLICATIONS AND ASSOCI- ATED METHODS OF USE AND MANUFACTURE; U.S. patent application Ser. No. 12/913,749, filed on Oct. 27, 2010 and titled ADAPTIVE CONTROL SYSTEM FOR FUEL INJECTORS AND IGNITERS; U.S. patent application Ser. No. 12/961,461, filed on Dec. 6, 2010 and titled INTEGRATED FUEL INJECTOR IGNITERS CONFIGURED TO INJECT MULTIPLE FUELS AND/OR COOLANTS AND ASSOCIATED METHODS OF USE AND MANUFACTURE; and U.S. patent application Ser. No. 12/961,453, filed on Dec. 6, 2010 and titled INTEGRATED FUEL INJECTOR IGNITERS HAVING FORCE GENERATING ASSEMBLIES FOR INJECTING AND IGNITING FUEL AND ASSOCIATED METHODS OF USE AND MANUFACTURE.

I claim:

1. An injector for introducing fuel into a combustion chamber and igniting the fuel in the combustion chamber, the injector comprising:
   an injector body including—
      a base portion configured to receive fuel into the body; and
      a nozzle portion coupled to the base portion, wherein the nozzle portion is configured to be positioned proximate to the combustion chamber for injecting fuel into the combustion chamber;
   an ignition feature in the nozzle portion, the ignition feature configured to generate an ignition event to at least partially ignite fuel;
   a valve carried by the body, wherein the valve is movable to an open position to introduce fuel into the combustion chamber; and
   a valve operator assembly, the valve operator assembly including—
      a valve actuator movable between a first position and a second position;
      a sensor configured to register one or more conditions in the combustion chamber; and
      an acoustical force modifier configured to at least partially control distribution of fuel injected into the combustion chamber, wherein the acoustical force modifier is responsive to the sensor and configured to induce vibrations in (a) fuel in the body and/or in the combustion chamber, (b) air in the combustion chamber, (c) the valve actuator to actuate the valve, and/or (d) the valve.

2. The injector of claim 1 wherein when the acoustical force modifier induces vibrations in the valve, the acoustical force modifier cyclically tensions and relaxes the valve driver, thereby instigating movement of the valve via the valve actuator.

3. The injector of claim 1 wherein the valve operator assembly further comprises a plurality of displacement drivers configured to displace a portion of the valve driver to instigate the actuation assembly to provide push, pull, and/or push and pull displacement of the valve actuator, thereby instigating movement of the valve.

4. The injector of claim 1 wherein the acoustical force modifier comprises at least one of a piezoelectric, magnetostrictive, electromagnetic, electromechanical, pneumatic, or hydraulic force generator.

5. A method of operating a fuel injector to inject fuel into a combustion chamber and ignite the fuel in the combustion chamber, the method comprising:
   introducing fuel into a body portion of the fuel injector, the body portion including a valve adjacent to the combustion chamber, the valve being movable between an open position and a closed position;
   actuating the valve to move from the closed position to the open position to introduce at least a portion of fuel into the combustion chamber;
   imparting acoustical energy to at least one of the fuel, the valve, or air in the combustion chamber;
   introducing a pattern of fuel through the valve from the body portion into the combustion chamber;
   generating an ignition event to at least partially ignite the fuel in the combustion chamber; and
   sensing one or more conditions in the combustion chamber, and wherein imparting acoustical energy comprises adaptively altering, in response to the sensing, the movement of the fuel, the valve, or the air in the combustion chamber.

6. The method of claim 5 wherein imparting acoustical energy comprises transferring energy to alter a vibrational frequency of at least one of the fuel, the valve, or the air in the combustion chamber.

7. The method of claim 5 wherein imparting acoustical energy comprises stimulating at least one of the fuel, the valve, or the air by means of a piezoelectric force, magnetostrictive force, electromagnetic force, electromechanical force, pneumatic force, or hydraulic force.

8. The method of claim 5 wherein imparting acoustical energy comprises propagating pressure waves of acoustical energy through the fuel and altering a frequency of vibration in the fuel.

9. The method of claim 5 wherein imparting acoustical energy comprises controlling the frequency, shape, pattern, and/or phase of fuel injection bursts into the combustion chamber.

10. The method of claim 5 wherein imparting acoustical energy comprises projecting a plasma of ionized air into the combustion chamber, thereby altering the frequency, shape, pattern, and/or phase of, fuel injection bursts in the combustion chamber.

11. The method of claim 5 wherein imparting acoustical energy comprises controlling the frequency of opening and closing the valve to induce sudden gasification of fuel injected into the combustion chamber.

12. The method of claim 5 wherein imparting acoustical energy comprises subjecting fuel to a pressure drop as the fuel passes through the valve into the combustion chamber.

13. The method of claim 5 wherein imparting acoustical energy comprises inducing a frequency above about 20,000 Hz in at least one of the fuel, the valve, or the air in the combustion chamber.

14. The method of claim 5, further comprising sensing a temperature or pressure in the combustion chamber and modifying the frequency, shape, pattern, and/or phase of fuel injection bursts into the combustion chamber in response to the sensed temperature or pressure.

15. A method of operating a fuel injector to inject fuel into a combustion chamber, the method comprising:
   introducing fuel into a body portion of the fuel injector, the body portion including a valve and a valve driver;
   sensing one or more conditions in the combustion chamber;
   generating acoustical energy based on the sensing one or more conditions to control movement of at least one of the fuel, the valve driver, the valve, or air in the combustion chamber; and
   generating an ignition event to at least partially ignite the fuel in the combustion chamber.

16. The method of claim 15 wherein generating acoustical energy comprises inducing vibrations having a vibrational frequency in the valve driver and opening and closing the valve at a regularity dependent on the vibrational frequency.

17. The method of claim 15 wherein generating acoustical energy comprises modifying the frequency, shape, pattern, and/or phase of the fuel.

18. The method of claim 15 wherein generating acoustical energy comprises generating acoustical energy having a first frequency, the method further comprising generating acoustical energy having a second frequency different than the first frequency in response to one or more sensed conditions in the combustion chamber.

19. The method of claim 15 wherein generating acoustical energy comprises introducing a plasma projection into the combustion chamber in response to the sensed conditions in the combustion chamber, the method further comprising altering a frequency of fuel in the combustion chamber in response to the sensing.

* * * * *